US009530006B2

(12) United States Patent
Troeger et al.

(10) Patent No.: US 9,530,006 B2
(45) Date of Patent: Dec. 27, 2016

(54) METHOD AND SYSTEM FOR PERFORMING A MEMORY SAFETY CHECK OF A PROGRAM WRITTEN IN AN UNMANAGED PROGRAMMING LANGUAGE

(71) Applicant: Oracle International Corporation, Redwood City, CA (US)

(72) Inventors: Jens Troeger, Redmond, WA (US); Vishv Mohan Malhotra, Blackmans Bay (AU)

(73) Assignee: Oracle International Corporation, Redwood Shores, CA (US)

(*) Notice: Subject to any disclaimer, the term of this patent is extended or adjusted under 35 U.S.C. 154(b) by 72 days.

(21) Appl. No.: 14/251,519

(22) Filed: Apr. 11, 2014

(65) Prior Publication Data

US 2015/0294113 A1    Oct. 15, 2015

(51) Int. Cl.
| | | |
|---|---|---|
| *G06F 21/50* | (2013.01) | |
| *G06F 21/57* | (2013.01) | |
| *G06F 21/53* | (2013.01) | |
| *G06F 21/56* | (2013.01) | |
| G06F 11/36 | (2006.01) | |

(52) U.S. Cl.
CPC ............ *G06F 21/577* (2013.01); *G06F 21/53* (2013.01); *G06F 21/566* (2013.01); *G06F 11/3624* (2013.01); *G06F 11/3636* (2013.01)

(58) Field of Classification Search
CPC ...... G06F 21/53; G06F 21/577; G06F 21/566; G06F 11/3624; G06F 11/3636
See application file for complete search history.

(56) References Cited

U.S. PATENT DOCUMENTS

| | | | |
|---|---|---|---|
| 8,479,286 B2* | 7/2013 | Dalcher | G06F 11/3466 726/22 |
| 2007/0192623 A1* | 8/2007 | Chandrasekaran | 713/189 |
| 2009/0249289 A1* | 10/2009 | Akritidis | 717/108 |
| 2014/0047419 A1* | 2/2014 | Gaster | 717/141 |
| 2014/0359248 A1* | 12/2014 | Peters et al. | 711/171 |

\* cited by examiner

*Primary Examiner* — Eleni Shiferaw
*Assistant Examiner* — Alexander Lapian
(74) *Attorney, Agent, or Firm* — Osha Liang LLP

(57) ABSTRACT

A method for performing a memory safety check of a program coded in an unmanaged programming language includes receiving an intermediate representation (IR) of the program and performing a static analysis pass of the IR to generate annotations including a safe pointer and an unsafe pointer. The method further includes removing, during a static analysis pass of the IR, the safe pointer from the annotations, inserting, into the IR using the annotations, a sandbox function call at the unsafe pointer to generate a modified IR, compiling the modified IR to generate an executable version of the program, executing, inside a sandbox framework, the executable version of the program, generating, during runtime and upon reaching the sandbox function call, a metadata entry and an enhanced pointer for atomicity, and comparing, during runtime and upon reaching a use of the unsafe pointer, the metadata entry with the enhanced pointer.

23 Claims, 8 Drawing Sheets

METHOD AND SYSTEM FOR PERFORMING A MEMORY SAFETY CHECK OF A PROGRAM WRITTEN IN AN UNMANAGED PROGRAMMING LANGUAGE

BACKGROUND

Ensuring the safety of applications has always been important. As viruses, trojans, hackers, and other malicious programs and/or individuals become more common, it is becoming even more essential to prevent any potential security flaws. Further, as the prevalence of distributed systems/networking environments increase, the possibility of one security flaw affecting many different interconnected parties increases. If a security flaw is present, malicious code or data attacks may impact the execution of the application and/or compromise code, data, or environment of any of the involved parties.

SUMMARY

In general, in one or more aspects, the invention relates to a method for performing a memory safety check of a program. The method includes receiving an intermediate representation (IR) of the program, wherein the program is coded in an unmanaged programming language; performing a first static analysis pass of the IR to generate a plurality of annotations comprising a safe pointer and an unsafe pointer; removing, during a second static analysis pass of the IR, the safe pointer from the plurality of annotations; inserting, into the IR using the plurality of annotations, a sandbox function call at the unsafe pointer to generate a modified IR; compiling the modified IR to generate an executable version of the program; executing, inside a sandbox framework, the executable version of the program; generating, during runtime and upon reaching the sandbox function call, a metadata entry and an enhanced pointer; and comparing, during runtime and upon reaching a use of the unsafe pointer, the metadata entry with the enhanced pointer.

In general, in one or more aspects, the invention relates to a system for performing a memory safety check of a program. The system includes a processor; a compiler, executing on the processor, and configured to: receive an intermediate representation (IR) of the program, wherein the program is coded in an unmanaged programming language; perform a first static analysis pass of the IR to generate a plurality of annotations comprising a safe pointer and an unsafe pointer; remove, during a second static analysis pass of the IR, the safe pointer from the plurality of annotations; insert, into the IR using the plurality of annotations, a sandbox function call at the unsafe pointer to generate a modified IR; and compile the modified IR to generate an executable version of the program; a sandbox framework executing on the processor and configured to: execute the executable version of the program; generate, during runtime and upon reaching the sandbox function call, a metadata entry and an enhanced pointer; and compare, during runtime and upon reaching a use of the unsafe pointer, the metadata entry with the enhanced pointer.

In general, in one or more aspects, the invention relates to a non-transitory computer readable storage medium (CRM) storing instructions for performing a memory safety check of a program. The instructions are executable on a processor and include functionality to: receive an intermediate representation (IR) of the program, wherein the program is coded in an unmanaged programming language; perform a first static analysis pass of the IR to generate a plurality of annotations comprising a safe pointer and an unsafe pointer; remove, during a second static analysis pass of the IR, the safe pointer from the plurality of annotations; insert, into the IR using the plurality of annotations, a sandbox function call at the unsafe pointer to generate a modified IR; compile the modified IR to generate an executable version of the program; execute, inside a sandbox framework, the executable version of the program; generate, during runtime and upon reaching the sandbox function call, a metadata entry and an enhanced pointer; and compare, during runtime and upon reaching a use of the unsafe pointer, the metadata entry with the enhanced pointer.

Other aspects of the invention will be apparent from the following description and the appended claims.

DETAILED DESCRIPTION

Figure 1:
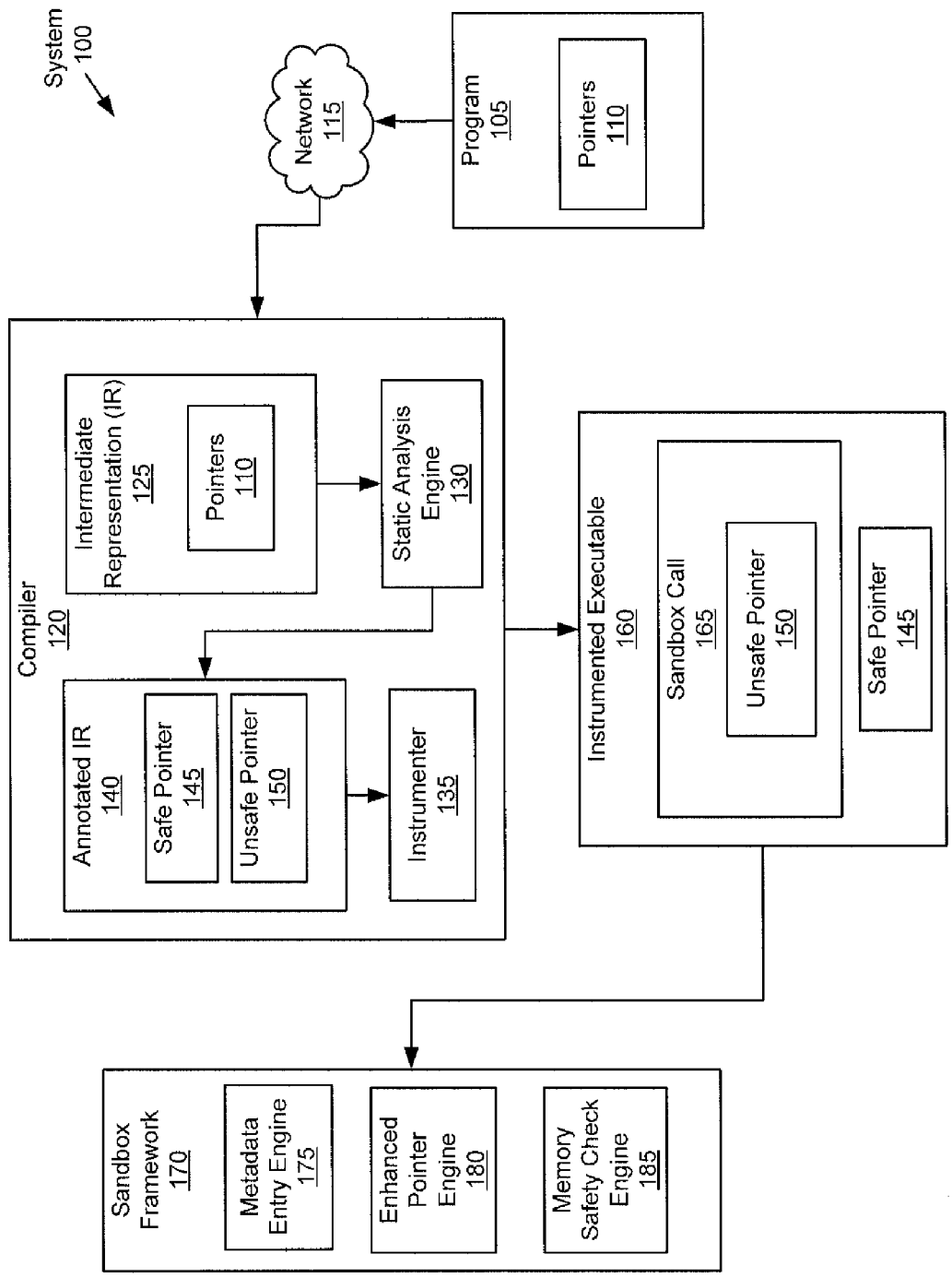
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for performing a memory safety check of a program coded in an unmanaged programming language. Specifically, embodiments of the invention provide a debug tool which, given an application's code base, can provide a framework that checks statically and dynamically for spatial, temporal, and privacy memory safety violations of that application, particularly with respect to pointers. Initially, the program is compiled to generate an intermediate representation (IR), and one or more static analysis passes are performed on the IR to generate a plurality of annotations. Safe and unsafe pointers may be identified during the static analysis processes. Eventually, static analysis is performed to remove the annotations associated with pointers that have been identified as safe. The remaining annotations may be used as locations to inject sandbox calls, resulting in a modified IR. The modified IR may be compiled to generate an executable version of the program. The executable utilizes a sandbox framework implementation that is able to perform memory safety checks on the unsafe points that have been instrumented with the sandbox calls.

To aid in understanding the following detailed disclosure, some definitions and explanations will be given. The invention is directed towards unmanaged programming languages. Unmanaged programming languages do not have mechanisms in place to prevent users/programmers from violating safety or security properties. In return for execution not being constrained, unmanaged programming languages provide better performance when code written in an unmanaged programming language is executed, such as faster execution and direct hardware and operating system access.

A managed programming language is the opposite of an unmanaged language. Managed programming languages constrain program execution by preventing some (or all) safety or security issues. Managed languages may include a virtual machine that takes the program's code and performs additional machine or environment-specific transformations. The environment may also include memory management, such as a garbage collector, and other security features meant to keep the program operating within its managed execution environment. In other words, memory safety is often performed by the environment of a managed programming language. The tradeoff of a managed language is performance—programs written in a managed language will typically execute slower than programs written in an unmanaged language.

A pointer or pointer value is a programming language object whose value points to another value stored elsewhere in the memory of the computer using the address of the other value. A pointer is said to reference a location in memory, and the action of obtaining the value/object/data/etc. stored at the location in memory that a pointer references is known as dereferencing the pointer. In one or more embodiments, a type, either a native machine type or a structural/compound type, is associated with the pointer value and defines the size of the memory access through that pointer value. In one or more embodiments, a pointer value may be either 4 bytes (32 bit) or 8 bytes (64 bit) long in order to accommodate a 32 bit, 48 bit, or 52 bit flat virtual address space, and/or any other value the hardware and operating system define for their respective virtual memory implementation. Alternatively, the pointer value may be of any other suitable length. In certain programming languages, the type of a pointer value can be transformed arbitrarily, independently of the memory object that the pointer points to.

There are many aspects to memory safety, such as spatial memory safety, temporal memory safety, and memory privacy safety. Spatial memory safety relates to the relationship between a typed or untyped pointer value and the bounds of a referenced memory object and/or the bounds of the fields of the memory object. The referenced memory object may be plain or typed. In one or more embodiments, spatial memory safety is implemented by maintaining size and/or location information for each allocated memory object. When viewed from the perspective of a typed pointer value, the type of the pointer value defines the boundaries of the referenced memory object. However, the boundaries of the referenced memory object may not align with, conform to, be able to be determined, and/or be validated, with respect to the field sizes and alignment of the type of the pointer. When viewed from the perspective of the typed memory object, a size of the memory allocation defines the boundaries of the memory object. In one or more embodiments, to ensure spatial memory safety, a determination if the use of a typed pointer value aligns with the properties of the referenced memory object is performed at compile time (i.e. statically) and/or runtime (i.e. dynamically).

Temporal memory safety relates to the relationship between the lifetime of a pointer value and the lifetime of a memory object at runtime, as well as any copies of the pointer value that may or may not leave scope. A pointer value becomes live when the memory object associated with the pointer value is allocated. Similarly, a pointer value becomes obsolete when the memory object associated with the pointer value is freed. However, a pointer variable's scope may extend beyond its valid lifetime, which may lead to uses of that pointer that result in memory safety violations. Violations of this relationship may include, but are not limited to: the use of a pointer value before a memory object has been allocated, the use of a pointer value after a memory object has been freed (i.e. stale or dangling pointer), the use of a pointer value after a memory object has been reallocated (i.e. stale or dangling pointer), losing the pointer value for an allocated memory object (i.e. a memory leak), freeing an already freed memory object, and freeing parts of an allocated memory object. In one or more embodiments, temporal memory safety may be implemented by maintaining a "memory allocation history" of all memory object allocations during a run of the target application.

Memory privacy safety relates to the relationship between the scope (i.e., current function stack frame, process heap, global, etc.) and context (i.e. thread, process, etc.) of a memory object allocation and the scope and context of its access (i.e. from other functions and/or threads, etc.). Examples of memory privacy may include, but are not limited to: determining if memory objects allocated on a stack frame are private to the thread executing the function, determining if memory objects allocated on a stack frame are obsolete (and potential security risks) after the function call has exited, and determining if an access to a private memory object is marked as a memory safety violation, even if the pointer was deliberately passed from the owning function or thread. For example, this may include access of a memory object located in a runtime stack frame of another thread, access of a memory object marked as thread_local by the other threads, access of a memory object on a local stack frame after the corresponding function exits, access of a memory object on a local stack frame through directly reaching based on the current register value (i.e. direct access outside of the current function's stack frame pointed at by register). Typically, memory privacy relates to user imposed constraints, which may be designed with respect to the context of a specific program or application.

Turning to FIG. 1, system (100) is shown in accordance with one or more embodiments of the invention. As shown in FIG. 1, the system (100) includes components such as a program (105), a compiler (120), an instrumented executable (160), and a sandbox framework (170). These components are described below and may be located on the same device, such as a server, mainframe, desktop Personal Computer (PC), laptop, Personal Digital Assistant (PDA), telephone, mobile phone, kiosk, cable box, and any other device, or may be located on separate devices connected by a network with wired and/or wireless segments, such as the Internet, a wide area network (WAN), or a local area network (LAN). In one or more embodiments of the invention, there may be more than one of any of the components shown in FIG. 1.

In one or more embodiments of the invention, a program (105) is a software program written/coded in an unmanaged programming language. As discussed above, an unmanaged programming language is a programming language that does not enforce safety or security properties. Program (105) is communicatively connected with compiler (120) via network (115). In one or more embodiments of the invention, program (105) and compiler (120) may be located on the same device. Alternatively, program (105) and compiler (120) may be located on separate devices. Program (105) may be a complete program. Alternatively, program (105) may be a code section and/or one file of many making up a complete program. In one or more embodiments, the program (105) includes pointers (110). Pointers (110), as discussed above, are programming language objects whose value points to another value stored elsewhere in the memory of the computer using the address of the other value. Pointers (110) may each be of any size, type, format, etc., may point to any valid (or invalid) memory location(s). Any number of pointers may be present in program (105), such as 5, 10, 1000, or more pointers.

In one or more embodiments of the invention, network (115) is one or more networks with wired and/or wireless segments, such as the Internet, a wide area network (WAN), or a local area network (LAN). Network (115) may use any format or protocol now known or later developed.

In one or more embodiments of the invention, the compiler (120) includes intermediate representation (IR) (125), static analysis engine (130), instrumenter (135) and annotated IR (140). Compiler (120) includes functionality to receive a program (i.e., program (105)) and generate an IR (i.e., IR (125)) of the program. IR is a data structure constructed from input data to a program, from which part or all of the output data of the program may be constructed. IR may take many forms, such as a graph. The IR (125) may be generated in any manner now known or later developed. Alternatively, compiler (120) may not generate IR (125)—rather, compiler (120) may receive IR (125) in any manner now known or later developed. IR (125) includes pointers (110), as pointers are still accounted for in IR, although the pointers may be in a different form.

In one or more embodiments of the invention, static analysis engine (130) includes functionality to perform static analysis on IRs of code (i.e. IR (125)). Static analysis is the process of analyzing programs without actually executing the programs. Static analysis may be used to check for a variety of errors, including but not limited to: memory safety errors. In general, in one or more embodiments of the invention, static analysis is used to determine whether or not a given pointer is "safe." A pointer is safe when no spatial memory, temporal memory, or memory privacy violations are present with respect to the pointer. Conversely, a pointer is unsafe when there are (or may be) spatial memory, temporal memory, or memory privacy violations present with respect to the pointer.

In one or more embodiments of the invention, the functionality of static analysis engine (130) is modular and staged. The functionality is modular by being implemented by a sequence of passes. The functionality is staged because each of the modular passes refines and extends the results of the previous one. Static analysis engine (130) detects pointer creations and tracks their respective value flow to as many pointer use sites as possible.

In one or more embodiments of the invention, static analysis engine (130) includes functionality to annotate the IR (125) to generate annotated IR (140). Annotations are markers or indicators of a point of interest (such as creation, use, deletion, etc. of pointers, etc.), and may be signals for other components of FIG. 1 to take action(s). There may be any number of different "types" of annotations, each representing different points of interest in a pointer value analysis. In one or more embodiments of the invention, a "swizzle" annotation represents a pointer creation. Specifically, an instruction which generates a valid pointer by means of a memory allocation is annotated with "swizzle." An "unswizzle" annotation represents a pointer use. Specifically, an instruction that dereferences a pointer value, or a function call to a known user of a pointer is annotated with an "unswizzle." In one or more embodiments of the invention, an "escape" annotation represents a pointer escape. Specifically, a pointer value is stored out into memory outside the control of a sandbox and a current value flow is unable to follow the value. This (temporarily) terminates the pointer value flow until later refinement. A "sanitize" annotation represents a pointer sanitize. Specifically, a pointer value is loaded from memory and the current value flow is unable to determine the origin of the loaded pointer. This temporarily introduces a new start point of the pointer value flow until later refinement.

In one or more embodiments of the invention, static analysis engine (130) includes functionality to generate a value flow graph that tracks every pointer value from its creation to all of the uses sites of the pointer value. In one or more embodiments of the invention, the completed value flow graph is used to check for spatial, temporal, and/or privacy memory safety violations. Specifically, in the value flow graph, leafs represent either pointer value creations (only out-edges) or uses (only in-edges), and inner nodes represent transformations (both in-edges and out-edges). A path from pointer creation to pointer use through the graph is called a slice. Initially, a pointer value flow graph is fragmented, as it is neither inter-procedural nor flow-sensitive, nor is value stores and loads connected in memory. A slice is therefore incomplete, as often times the slice cannot connect a pointer creation to all of its uses if the pointer value is passed between functions, or if the pointer value is stored to and loaded from memory. If a pointer value can not be followed from creation to use, the pointer value is said to "escape." Similarly, if a pointer value is loaded from unknown memory and then connected to a use, it is said to be "sanitized."

In one or more embodiments of the invention, static analysis engine (130) includes functionality to build the pointer value flow graph in several iterative stages until a fixed point is reached. The fixed point may be any suitable point, set by any standard and/or user. Initially, the first pass finds and collects all possible start and end points of slices. In other words, it collects the leaves of the pointer value flow graph. These leaves are collected into two sets: a set of start points and a set of end points. The set of start points includes all valid pointer creations through memory allocations. The set of end points includes all pointer uses.

In one or more embodiments of the invention, static analysis engine (130) includes functionality to perform forward flow analysis. Given the set of start points of slices, forward flow analysis follows every start point until an end point is reached, and subsequently annotates each use of the pointer with "unswizzle." Alternatively, if the value is stored to memory, cast to integer, or passed to an external function, an "escape" annotation is added, and the instruction is added to the end points set. If a transformation point is reached (e.g. pointer arithmetic, or a pointer type cast), the analysis continues.

In one or more embodiments of the invention, static analysis engine (130) includes functionality to perform backward flow analysis. In backward flow analysis, all unannotated end points of slices are followed until a start point is reached, and subsequently annotated with "swizzle." Alternatively, if a value is loaded from memory, cast from integer, or returned from a function call, a "sanitize" annotation is added, and the instruction is added to the start points set. If a transformation point is reached (e.g. pointer arithmetic, or a pointer type cast), the analysis continues. In one or more embodiments of the invention, static analysis engine (130) includes functionality for placing a demand on a value, (i.e. a value loaded from memory is just a value, until the backward flow analysis from an end point finds this value to be a relevant pointer value). The demand then creates new leaves in the value flow graph and adds new values to the start points set, which in turn requires another forward flow and backward flow pass. Static analysis engine (130) includes functionality to alternate between forward flow and backward flow analysis until a fixed point is reached.

In one or more embodiments of the invention, static analysis engine (130) includes functionality to generate annotated IR (140), and identify safe pointer (145) and unsafe pointer (150). Further, static analysis engine (130) includes functionality to remove annotations associated with safe pointer (145). The removal of annotations may occur after the pointer value flow graph has reached a fixed point.

In one or more embodiments of the invention, instrumenter (135) includes functionality to modify the annotated IR (140) into an instrumented IR (not shown). Specifically, once static analysis is completed, all left over annotations indicate memory accesses which could not be checked at compile time and therefore require further runtime checks. Instrumenter (135) takes an instrumented IR, and injects appropriate sandbox calls into the instrumented IR (resulting in the instrumented IR), which is consumed by the standard compiler to generate the instrumented executable (160), which is the output of the instrumenter (135).

In one or more embodiments of the invention, instrumented executable (160) is an executable version of program (105) that has been statically checked for memory safety. Instrumented executable (160) includes sandbox call (165), unsafe pointer (150), and safe pointer (145). Sandbox call (165) was inserted by instrumenter (135) at any remaining annotations after static analysis was completed. In particular, sandbox call (165) is inserted around uses of unsafe pointers (i.e., unsafe pointer (150)). Due to the static analysis, safe pointer (145) may not have any associated sandbox calls, as shown in FIG. 1. Alternatively, safe pointer (145) may have associated sandbox calls. Instrumented executable (160) is executed within a sandbox framework (170).

In one or more embodiments of the invention, a sandbox framework (170) is a dynamic runtime (safety) checking framework. Specifically, sandbox framework (170) is a linker library that provides functions to create and maintain metadata for unsafe pointer and memory allocations, as well as functions that validate if a given pointer and pointer use for memory access or other are safe with respect to the known metadata information. Not all memory accesses of a program can be checked statically, and therefore the memory access that have not been determined to be safe (i.e., the unsafe pointers, etc.) need to be checked at runtime by invoking functions of the sandbox framework (170). Based on the annotation of the static analysis, the Sandbox only ever knows about those memory allocations that invoke sandbox framework (170)—the sandbox may not check memory accesses to allocations that do not invoke the sandbox. In that case, the sandbox may either let the memory access pass or halt execution.

An example sandbox API is demonstrated below:

```
// External API functions used by the instrumentation pass. These are
// merely trampolines into the sandbox, but also allow us to monitor and
// stub out sandbox execution from an instrumented application.
// Allocate a metadata entry for the given heap memory allocation of the
// given size. Returns the metadata handle (Enhanced Pointer). Note
// The caller is still responsible for the memory allocation, and the sandbox
// will not detect errors correctly if this is used by the application directly.
void *heap_make_entry(void *cptr, size_t nmemb, size_t size);
    // Rewrite the metadata entry with a new address and size. Return the
// same metadata handle (Enhanced Pointer).
    void *heap_rewrite_entry(void *lptr, void *cptr, size_t size);
// Free a heap metadata entry. Returns the plain pointer of the allocated
// memory for freeing by the caller.
void *heap_free_entry(void *lptr);
    // Wrapper to allocate memory from the process heap. This handles
// Enhanced Pointer administration.
void *heap_malloc(size_t size);
// Wrapper to allocate memory for an array from the process heap. This
// handles Enhanced Pointer administration.
void *heap_calloc(size_t nmemb, size_t size);
// Wrapper to re-allocate/free memory from the process heap. This handles
// Enhanced Pointer administration.
void *heap_realloc(void *lptr, size_t size);
// Wrapper to free allocated heap memory. This handles Enhanced Pointer
// Administration.
void heap_free(void *lptr);
// Push a function frame marker onto the shadow stack.
void stack_new_frame( );
// Allocate a metadata entry for the given stack allocation of the given
size.
// Returns a metadata handle (Enhanced Pointer).
void *stack_make_entry(void *cptr, size_t nmemb, size_t size);
// Free all stack metadata entries allocated for the given function frame.
void stack_free_frame( );
// Allocate a metadata entry for the given global allocation for the given
// size. Returns a metadata handle (Enhanced Pointer).
void *global_make_entry(void *cptr, size_t size);
// Check if a 'size' bytes memory access through the given handle
// (Enhanced Pointer) is safe. If so,
// return the original plain pointer value for that memory access.
void *unswizzle_typed(void *lptr, size_t size);
// Let the given Enhanced Pointer value escape: unswizzle it into a C
// pointer and let it go.
void *escape(void *lptr);
// Escape the given Enhanced Pointer value to address toaddr, and return
// the unswizzled C pointer. This function implements a SoftBounds/icc
// style mapping from pointer location to Metadata Entry index.
void *escape_to(void *lptr, void *toaddr);
// Sanitise the given pointer (C pointer, or Enhanced Pointer) for the
// memory-safe
// C sandbox. This generates a Enhanced Pointer value, possibly with
// "wrong" history.
void *sanitise(void *cptr);
// Sanitise the given C pointer loaded from address fromaddr; if the ptr can
// not be found in the escape buffer, a proper sanitise( ) is performed.
void *sanitise_from(void *cptr, void *fromaddr);
// Return the size of the allocation referred to by the given Enhanced
// Pointer.
uint64_t get_absolute_allocation_size(void *lptr);
// Return the remaining size of the allocation referred to by the given
// Enhanced Pointer; if the Enhanced Pointer refers to the
// base of the allocation then the remaining size is equal to the size of the
// allocation.
uint64_t get_remaining_allocation_size(void *lptr);
//@{ The following functions support an inversion of the Enhanced
Pointer
//Sandbox. Instead of keeping a Enhanced Pointer within the scope of a
// function and escaping it to its plain C value upon store, the inversion
// keeps both the plain C pointer and a Enhanced Pointer metadata skeleton
// value within function scope, and then compresses both into an atomic
// Enhanced Pointer for store or decompresses them from an atomic
// Enhanced Pointer into a plain C pointer and its metadata skeleton upon
// load. This allows for atomic loading/storing of pointer+metadata in a
// multi-threaded application.
// Given a plain C pointer and a Enhanced Pointer skeleton (i.e. offset field
// is 0) and compress the two values into a single Enhanced Pointer value
// for atomic store. Return the storable Enhanced Pointer.
void *compress_for_store(void *cptr, void *lptr);
// Given a loaded compressed Enhanced Pointer value, decompress it into
// its plain C pointer and
// a Enhanced Pointer skeleton. Return the plain C pointer.
void *decompress_from_load(void *lptr);
```

-continued

```
// Given a plain C pointer and an Enhanced Pointer, check if an access of
'size'
// bytes is safe.
void unswizzle_typed(void *cptr, void *lptr, size_t size);
// Push a Enhanced Pointer skeleton value onto the function shadow stack.
void shadow_push_lptr(void *lptr);
// Pop a Enhanced Pointer skeleton value from the function shadow stack.
void *shadow_pop_lptr( );
```

As may be seen from the above API, the sandbox provides functions that create metadata entries for memory allocations, as well as functions that handle the lookup and validation of memory accesses. An instrumented application calls these functions directly. In addition to the above functions exists a wrapper function for the application's main( ) function as well as constructor and destructor functions that hook into the programming language's (e.g. C) runtime to initialize and shutdown the Sandbox outside of the main wrapper function. While the sandbox may perform heap memory allocations, it may also only handle metadata creation and validation without allocating memory for the application (e.g. the application owns all of its memory handling without middleman).

The sandbox may also extend a plain pointer value with additional information resulting in the creation of an enhanced pointer value. The creation (e.g. "swizzle" of plain C pointer values when they are created) and use (e.g. "unswizzle" into original C pointer values, or direct use of the enhanced pointer value) of enhanced pointer values can be viewed as executing the target application code inside of a "memory safe sandbox". However, in contrast to more confined sandboxes, the only observed resource here is memory. In addition, pointer values may escape the sandbox by being stored out into unmonitored memory, and/or enter the sandbox by being loaded from unmonitored memory. In this context, unmonitored memory may be memory locations where our static analysis was unable to track the value flow of the created pointer values precisely enough. When an enhanced pointer value escapes, it must be "unswizzled" into a plain pointer value. When an enhanced pointer value enters the sandbox (almost equivalent to a pointer creation) it needs to be checked against the known metadata to construct a valid enhanced pointer. If no metadata entry can be found, a dummy is used which provides neither spatial nor temporal information, but triggers warning at their use. The sandbox may assume a closed system where there are no unmonitored or unknown functional components. In other words, all pointer creations, memory allocations, and pointer uses are either instrumented, or they are known of.

In one or more embodiments of the invention, the sandbox allows an application to "compress" a plain pointer and its metadata into a compressed pointer (which is similar in layout to an enhanced pointer, and may even be the same) when pointers are stored into memory, and likewise such a compressed pointer may be "decompressed" into a plain pointer and its separate metadata value when pointers are loaded from memory. This allows the sandbox to handle atomicity of pointer stores and loads in a memory safe execution for multi-threaded programs.

The metadata entry engine (175) is the portion of the sandbox framework (120) that generates a metadata entry. The enhanced pointer engine (180) is the portion of the sandbox framework (120) that generates an enhanced pointer. The memory safety check engine (185) is the portion of the sandbox framework (120) that performs memory safety checks on the enhanced pointer and the metadata.

Memory safety violations may be handled as follows: actual and suspected memory access violations detected during the static analysis should warrant a compile time warning or error, depending on its severity. If a memory access fails its runtime checks (i.e. dynamic analysis), a notification should be generated immediately so that the issue may be debugged as close to the actual fault site as possible.

A memory safety error may be thrown by an enhanced pointer checker function. This function is part of the sandbox, and is called before a memory access (e.g. load or store instruction) happens. The function takes an enhanced pointer as its argument, and if everything verifies as valid it returns the actual address for the valid memory access.

Figure 2A:
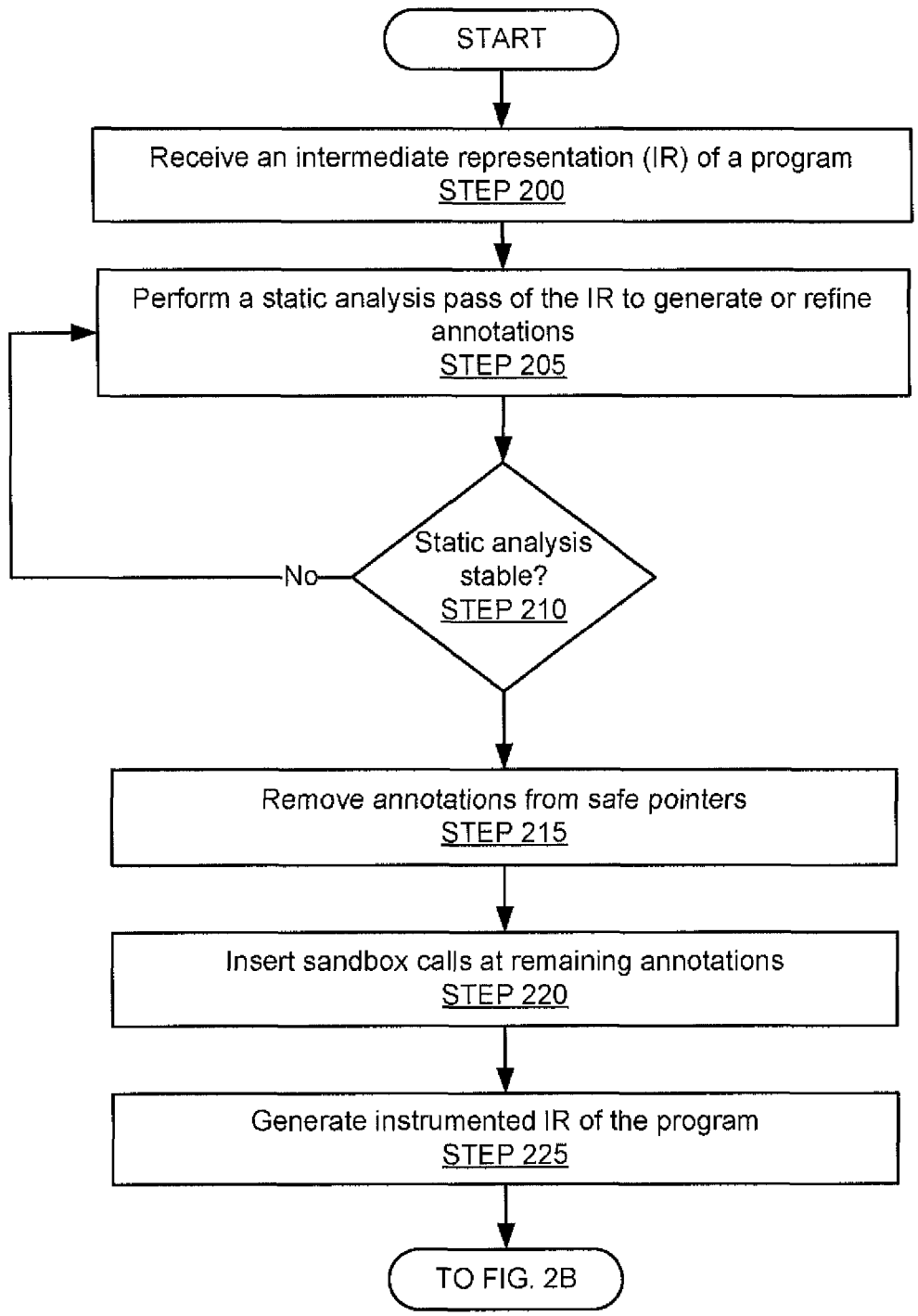
FIGS. 2A and 2B show flowcharts in accordance with one or more embodiments of the invention.

FIG. 2A shows a flowchart in accordance with one or more embodiments of the invention. The process shown in FIG. 2A may be used, for example, with the system (100), to perform a memory safety check of a program written in an unmanaged programming language. The sequence of steps shown in FIG. 2A may differ among embodiments of the invention, and one or more of the steps may be performed in parallel and/or may be optional. Accordingly, the scope of the invention should not be considered limited to the specific arrangement of steps shown in FIG. 2A.

In Step 200, an IR of a program is received. In one or more embodiments of the invention, the program is coded in an unmanaged programming language. The IR may be received from any source and in any manner now known or later developed.

In Step 205, a static analysis pass is performed on the IR to generate or refine annotations. If the static analysis pass is the first pass performed on the IR, then every pointer creation and use are marked, and sets of starting and ending points for a pointer value flow graph are created. If the static analysis pass is a consecutive pass, then an attempt is made to connect each of the starting points with the end points. Similarly, an attempt may be made to connect each of the end points with the starting points, as the static analysis may proceed both forwards and backwards. Each of a variety of points may be annotated during the static analysis. In one or more embodiments of the invention, there are different annotations for different kinds of memory access, such as pointer creation, pointer use, etc. The static analysis may be performed any number of times. The number of times may be a set amount, or may be dependent on how stable the pointer value flow graph is (i.e., if the pointer value flow graph is not changing after repeated passes, then the passes should end, etc.).

In Step 210, a determination is made whether the static analysis is stable. If the static analysis is not stable, the method returns to Step 205. If the static analysis is stable, the method proceeds to Step 215.

In Step 215, annotations for safe pointers are removed. In one or more embodiments of the invention, the annotations may be removed during a final static analysis pass. Alternatively, the annotations may be removed before the final static analysis pass, such as whenever a pointer is determined to be safe. The annotations may be removed in any manner now known or later developed.

In Step 220, sandbox calls are inserted at the remaining annotations. The sandbox calls indicate that the use of the associated pointer has not successfully been determined to be safe statically, and therefore runtime memory safety checks should be performed. Further, the sandbox calls enable the runtime memory safety checks to be performed only on those memory accesses which may potentially cause memory safety issues. In other words, the memory accesses that were previously determined to be safe are not interfered with by runtime memory safety checks.

In Step 225, an instrumented IR of the program is generated. The instrumented executable may be generated in any manner now known or later developed. When compared to the original program, the instrumented executable contains added sandbox calls. The instrumented executable is able to be executed in any manner now known or later developed. After Step 225, the method proceeds to FIG. 2B.

It will be apparent to one of ordinary skill in the art, having the benefit of this disclosure, that the steps of FIG. 2A occur at compile time (i.e., statically). The use of static analysis to determine which pointers are safe, and which are unsafe, is passed on to the runtime safety check components, thereby lessening the amount of runtime safety checks which need to be performed. In this way, the reduction in performance caused by implementing safety checks in an unmanaged programming language is reduced.

Figure 2B:
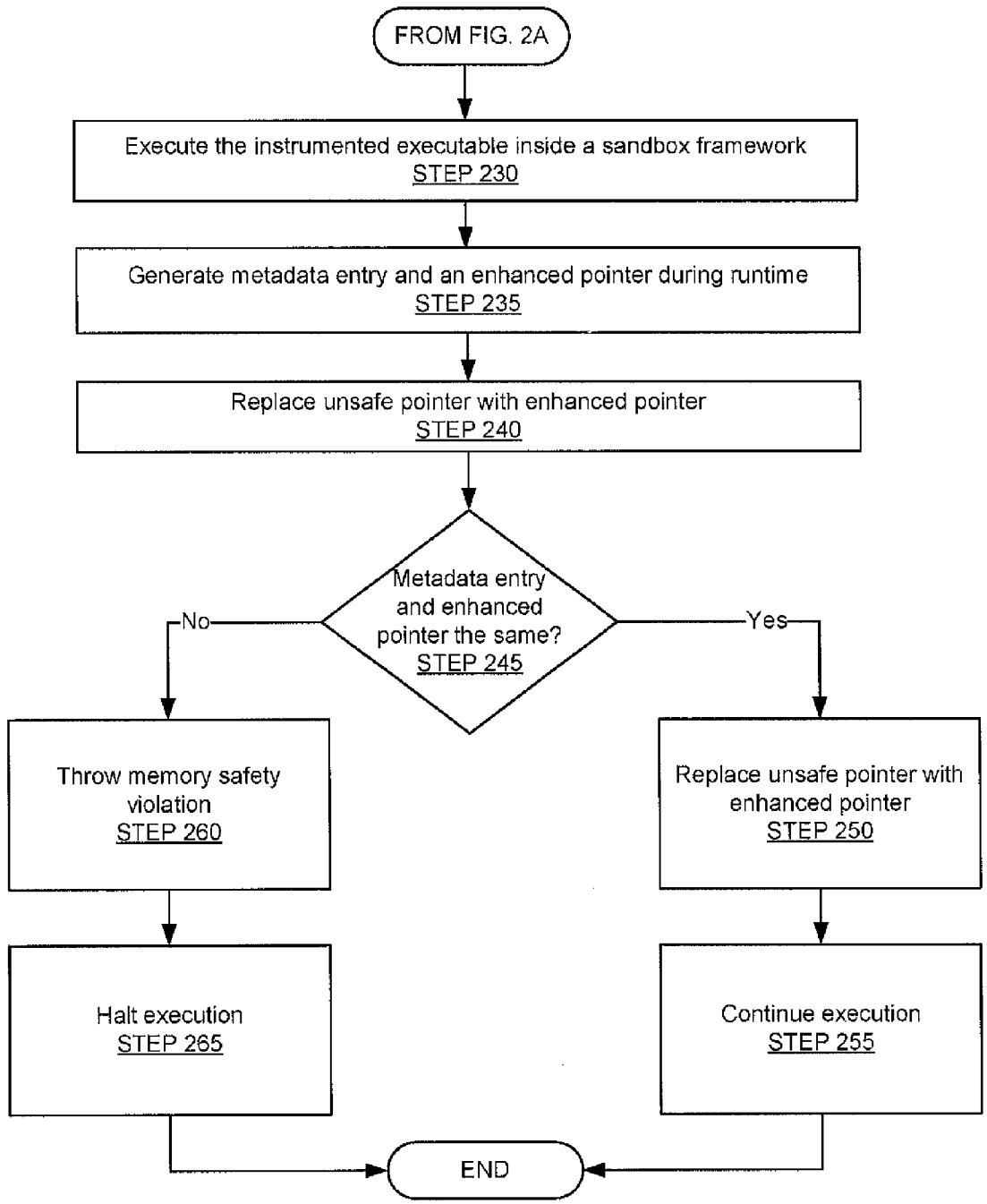

FIG. 2B shows a flowchart in accordance with one or more embodiments of the invention. The process shown in FIG. 2B may be used, for example, with the system (100), to perform a memory safety check of a program written in an unmanaged programming language. The sequence of steps shown in FIG. 2B may differ among embodiments of the invention, and one or more of the steps may be performed in parallel and/or may be optional. Accordingly, the scope of the invention should not be considered limited to the specific arrangement of steps shown in FIG. 2B.

In Step 230, the instrumented executable is executed inside a sandbox framework. The sandbox framework protects the executing program against memory safety violations by performing runtime safety checks on memory accesses which have not been determined to be safe.

In Step 235, a metadata entry and an enhanced pointer are generated during runtime. Specifically, the metadata entry and the enhanced pointer are generated when a first creation of an unsafe pointer and new memory allocation occurs. The metadata entry is used to track all relevant information about a single memory allocation including, but not limited to: an address value, the size of the memory allocation in bytes, and a signature value. The enhanced pointer may include an offset, a signature, and an index value. The enhanced pointer allows for easy and fast accessing of the corresponding metadata entry, allowing for runtime checks to be performed quickly and efficiently.

In Step 240, an unsafe pointer is replaced with the enhanced pointer. The enhanced pointer will flow through the program in the stead of the original unsafe pointer. When a use of the unsafe pointer/enhanced pointer occurs, the method proceeds to Step 245.

In Step 245, a determination is made whether an enhanced pointer and the associated metadata entry are the same. If the enhanced pointer and the associated metadata entry are not the same, the method proceeds to Step 260. If the enhanced pointer and the associated metadata entry are the same, the method proceeds to Step 250.

In Step 250, the original unsafe pointer is reconstructed. In this case, the memory safety check(s) is performed. If the memory safety check(s) is successful the unsafe pointer is, at least in the current instance, safe to use. Thus, the program is allowed to use the unsafe pointer as intended. If the safety check fails, the method proceeds to Step 260.

In Step 255, execution continues. Although not shown, execution may return to any suitable steps of FIG. 2B, particularly Steps 235, 240, and 245 as many times as needed. After Step 255, the method ends.

In Step 260, a memory safety violation is thrown. In this case, the memory safety check was not performed successfully, and the unsafe pointer is not safe to use in the current instance. Thus, a memory safety violation is thrown. The memory safety violation may be thrown in any manner now known or later developed, and may contain any suitable debugging or other data.

In Step 265, execution is halted. Execution may be halted in any manner now known or later developed. In one or more embodiments of the invention, Step 265 is optional, as execution may be allowed to continue in some instances despite having a memory safety violation.

It will be apparent to one of ordinary skill in the art, having the benefit of this disclosure, that the steps of FIG. 2B occur at run time (i.e., dynamically). The runtime safety checks are performed only on unsafe pointers, and therefore do not impact the performance/execution of safe pointers. This enables the memory safety checks to be narrowly tailored to accesses that may result in safety violations. Further, due to the replacement of the original unsafe pointer with an enhanced pointer the access time of the associated metadata is very low, further reducing the overhead associated with implementing runtime memory checks.

Figure 3:
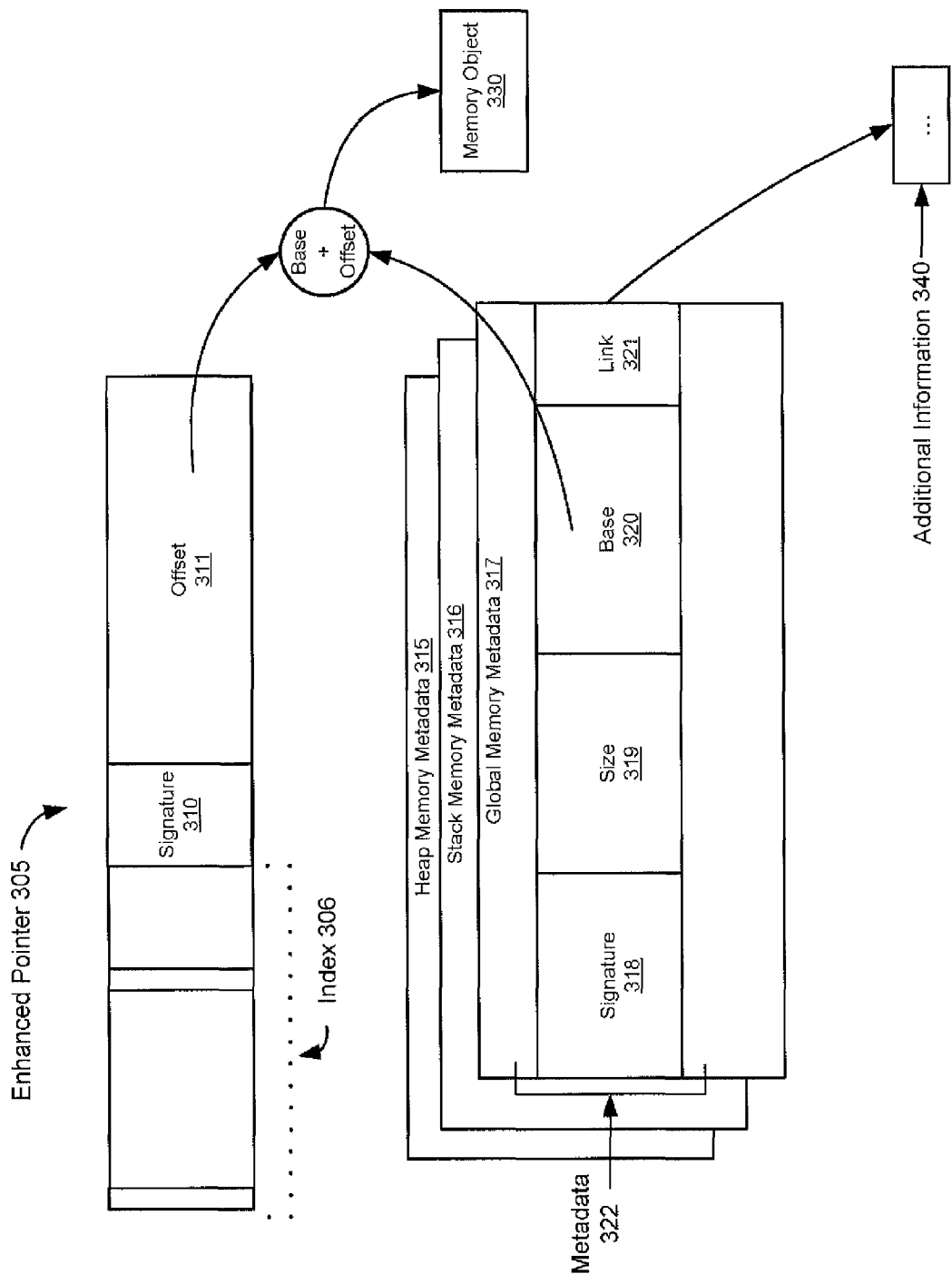
FIGS. 3, 4A, 4B, and 4C show examples in accordance with one or more embodiments of the invention.

FIG. 3 shows an example enhanced pointer in accordance with one or more embodiments of the invention. The example enhanced pointer shown in FIG. 3 may be used, for example, with the system (100), to perform a memory safety check of a program written in an unmanaged programming language. The example enhanced pointer shown in FIG. 3 may differ among embodiments of the invention, and one or more of the elements shown may be optional.

In FIG. 3, an enhanced pointer (305) is an augmented version of a regular pointer value with additional information. Specifically, the enhanced pointer (305) may contain an index (306), a signature (310), and an offset (311).

The index (306), is used to identify an enhanced pointer value. In other words, the index may be an address of a metadata. The index (306) may be broken down into various parts to signal the location and/or type of the enhanced pointer value (i.e., heap, stack, global). The signature (310) is a value that is used to identify the enhanced pointer. The offset (311) is a value that specifies that offset into the allocated memory block (which may be contained in the original pointer).

A virtual memory space that is available to allocate memory objects into may be divided into several memory spaces. A global memory space (317), a stack memory (316), and a heap memory (315). Memory object allocations in the global space and on the heap are managed on a per process basis; these allocations can be shared by various threads running in the same process. Such memory object allocations may be primarily managed by the operating system and allocated through memory allocation and deallocation instructions (e.g. malloc and free) calls. Global allocations in particular may be initialized by the image loader and dynamic linker prior to the program runtime. In the stack memory (316), memory object allocations may be managed and maintained privately to each thread in the process. The management of the stack memory (316) (e.g. local stack frames, function activation records) may be controlled by the compiler generated code.

The heap memory metadata (315), stack memory metadata (316), and global memory metadata (317) each demonstrate different types of metadata (322). In FIG. 3, the metadata (322) contains a signature (318), a size (319), a base (320), and a link (321). The signature (318) is a value used to identify the metadata (322), and must match the signature of the enhanced pointer for temporal memory safety. The size (319) is a size of the memory allocation in bytes, the base (320) is an address of an object in memory, and the link (321) is a pointer to additional information (340). The additional information (340) may contain information relating to, for example, debugging. As demonstrated in FIG. 3, the base (320) plus the offset (311) equals the location of a memory access of an allocated memory object. A memory object (330) is an object that is pointed to by the enhanced pointer (305) and the metadata (322).

Figure 4A:
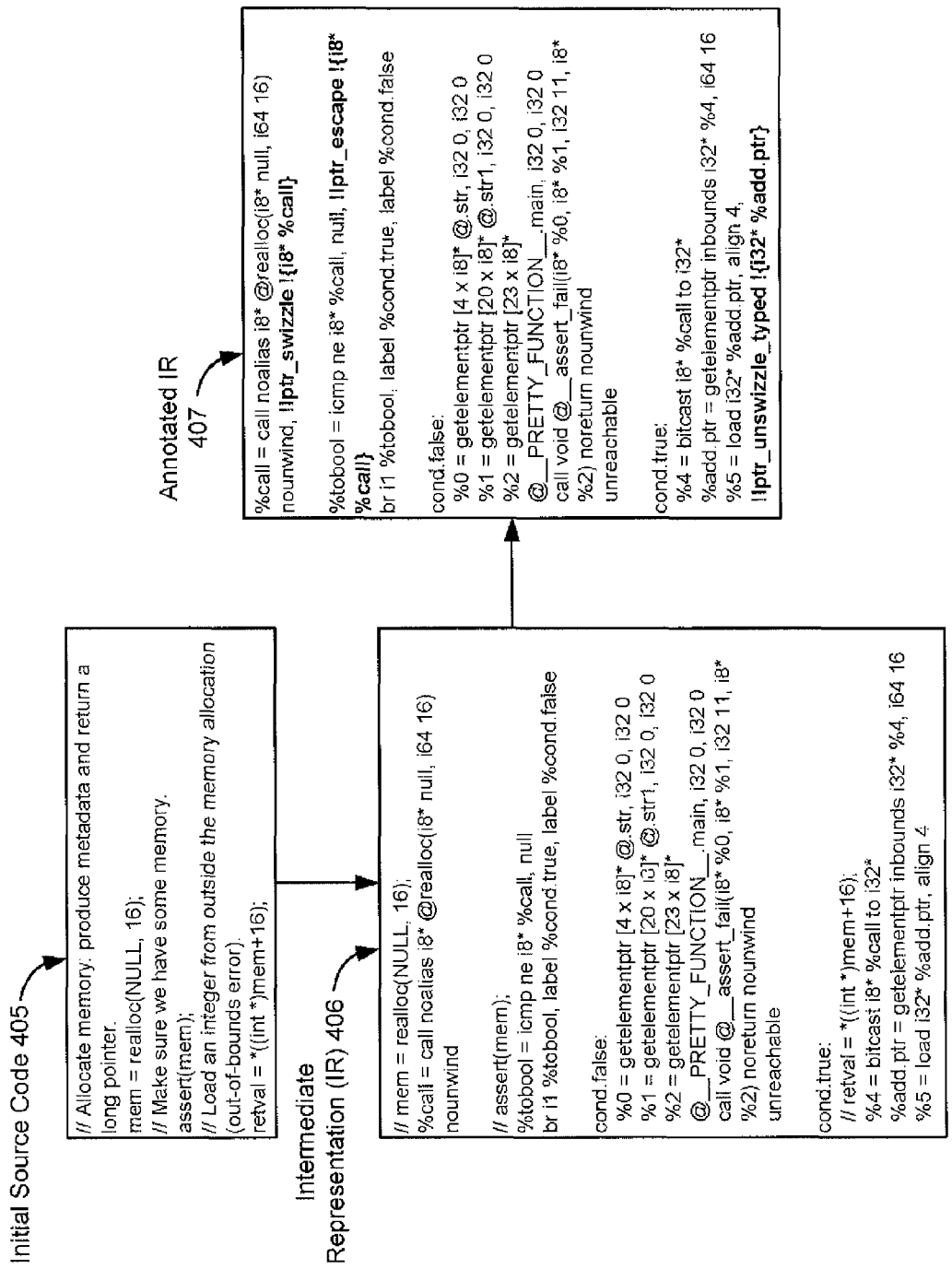

FIG. 4A shows example code workflow in accordance with one or more embodiments of the invention. The example code workflow shown in FIG. 4A may be used, for example, with the system (100), to perform a memory safety check of a program written in an unmanaged programming language. The example code workflow shown in FIG. 4A may differ among embodiments of the invention, and one or more of the steps may be performed in parallel and/or may be optional.

In FIG. 4A, initial source code (405) is displayed. The initial source code (405) is a program that is written in an unmanaged programming language, and may contain program statements, definitions, comments, and various other programming language constructs. During compilation, the initial source code (405) is transformed into the intermediate representation (IR) (406). The IR (406) is a modified version of the initial source code (405) that has been compiled. The annotated IR (407) is a modified version of the IR (406) that has annotations added by the static analysis. For example, the bold portions of annotated IR (407) may be annotations (e.g. "!ptr_swizzle !{i8* %call}", "!ptr_escape !{i8* %call}", "!ptr_unswizzle_typed !{i32* %add.ptr}"). The "swizzle" annotation indicates a memory allocation. In other words, metadata and an enhanced pointer must be produced at runtime. The "escape" annotation indicates the use of a pointer value as data. In other words, the enhanced pointer must be turned into its plain original value for that use. The "unswizzle_typed" annotation indicates the use of a pointer value to access memory. In other words, the enhanced pointer must be checked for the memory access and the plain original value must be returned. The process described in FIG. 4A proceeds in FIG. 4B.

Figure 4B:
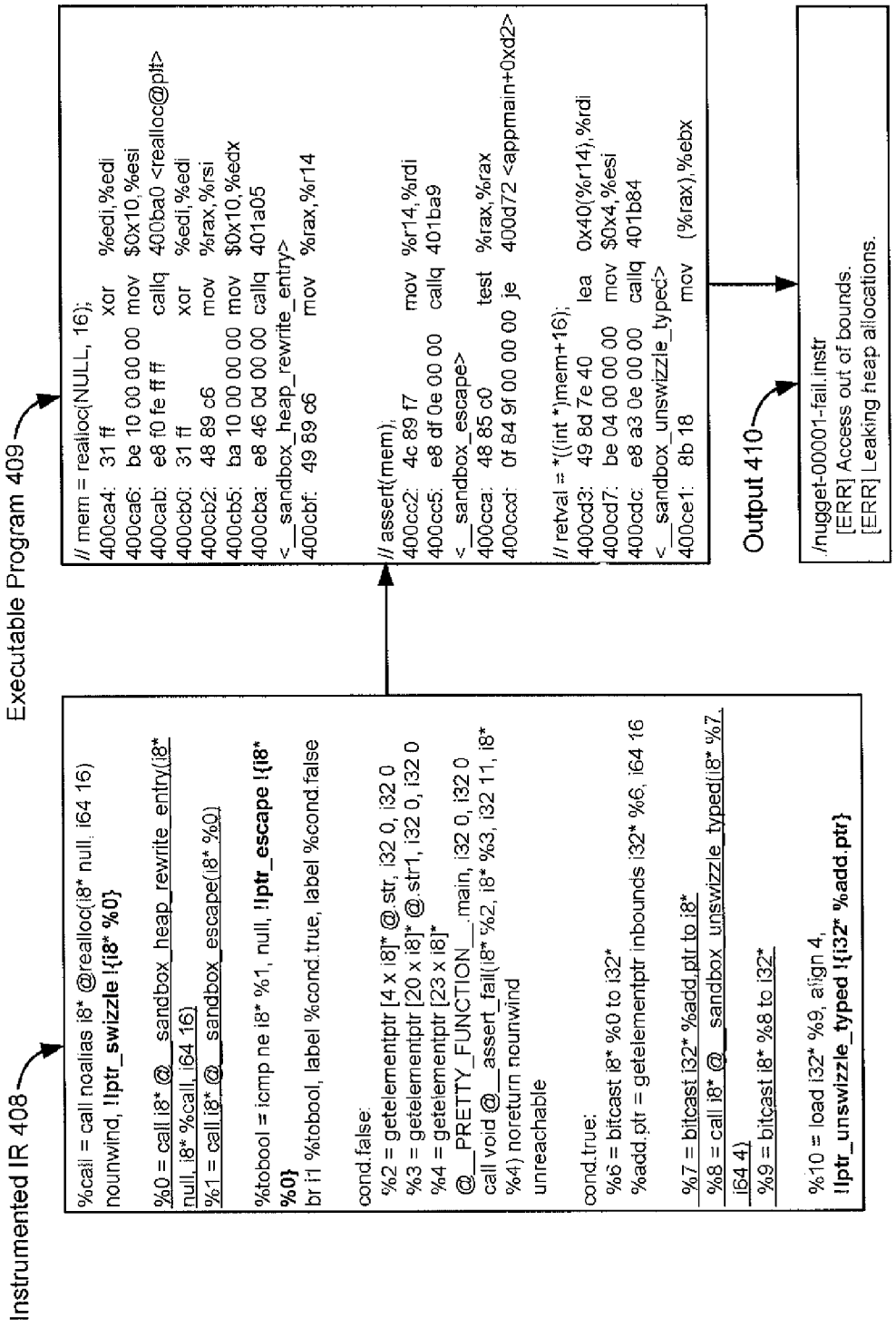

FIG. 4B shows example code workflow in accordance with one or more embodiments of the invention. The example code workflow shown in FIG. 4B may be used, for example, with the system (100), to perform a memory safety check of a program written in an unmanaged programming language. The example code workflow shown in FIG. 4B may differ among embodiments of the invention, and one or more of the steps may be performed in parallel and/or may be optional.

In FIG. 4B, the instrumented IR (408) is a modified version of the annotated IR (407) that has been instrumented. The instrumentation consumes an annotated bitcode file, wraps the application's main( ) function into the sandbox startup code, adds access to the application's global variable allocations, and injects Sandbox calls according to the annotations, while keeping the original debug information consistent. The instrumented bitcode file is then compiled and optimized into native code. In the instrumented IR (408), the underlined portions of code may be additions (e.g. "%0=call i8* @_sandbox_heap_rewrite_entry(i8* null, i8* %call, i64 16)", "%1=call i8* @_sandbox_escape(i8* %0)", "%7=bitcast i32* %add.ptr to i8*", "%8=call i8* @_sandbox_unswizzle_typed(i8* %7, i64 4)", and "%9=bitcast i8* %8 to i32*").

The instrumented IR (408) is extended with calls to the sandbox whenever pointer values are handled. Instrumented IR (408) is used to generate an executable program (409). The output of running the executable program (409) is the output (410).

Figure 4C:
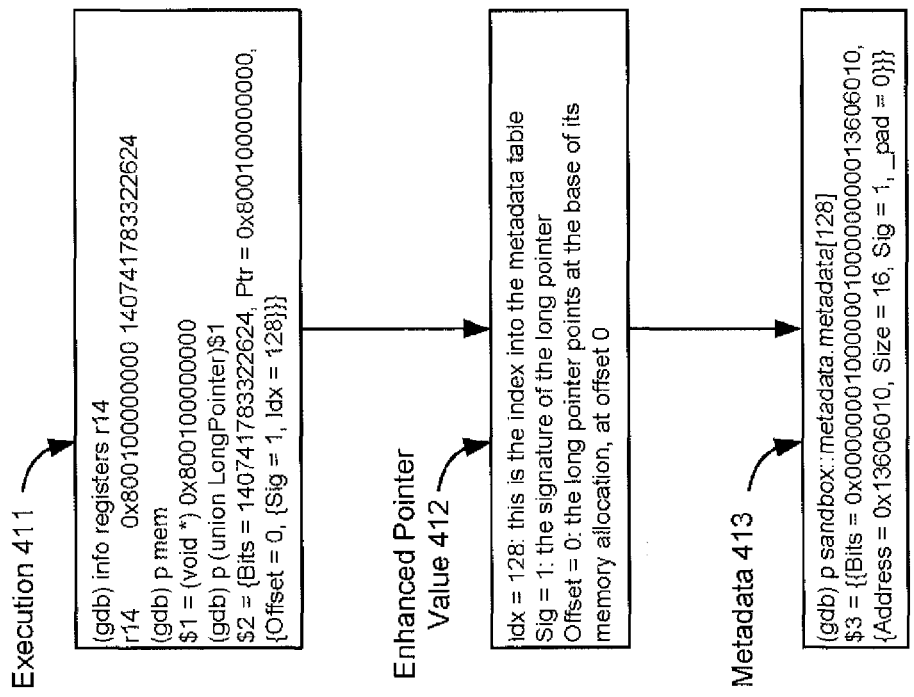

FIG. 4C shows example code workflow in accordance with one or more embodiments of the invention. The example code workflow shown in FIG. 4C may be used, for example, with the system (100), to perform a memory safety check of a program written in an unmanaged programming language. The example code workflow shown in FIG. 4C may differ among embodiments of the invention, and one or more of the steps may be performed in parallel and/or may be optional.

In FIG. 4C, the executable program (409) returns the computed enhanced pointer value and moves it into register %r14, which is the variable "mem" in the initial source code (405) in FIG. 4A. This enhanced pointer value is demonstrated in the execution (411). The enhanced pointer value (412) is displayed, and the metadata associated with the enhanced pointer value (412) is displayed as metadata (413). Using the Idx=128 field above, we can look up the metadata directly and inspect the metadata for this enhanced pointer. The base address of the allocation is stored in the Address=0x13606010 field, the allocation size in the Size=16 field, and this metadata entry has the same signature Sig=1 as the enhanced pointer value, thus establishing a valid pointer-to-allocation pair for access (i.e. this is not a stale or dangling pointer, not a temporal memory safety violation). Those skilled in the art will appreciate that there may be various other source code examples and functionalities that have not been described.

Figure 5:
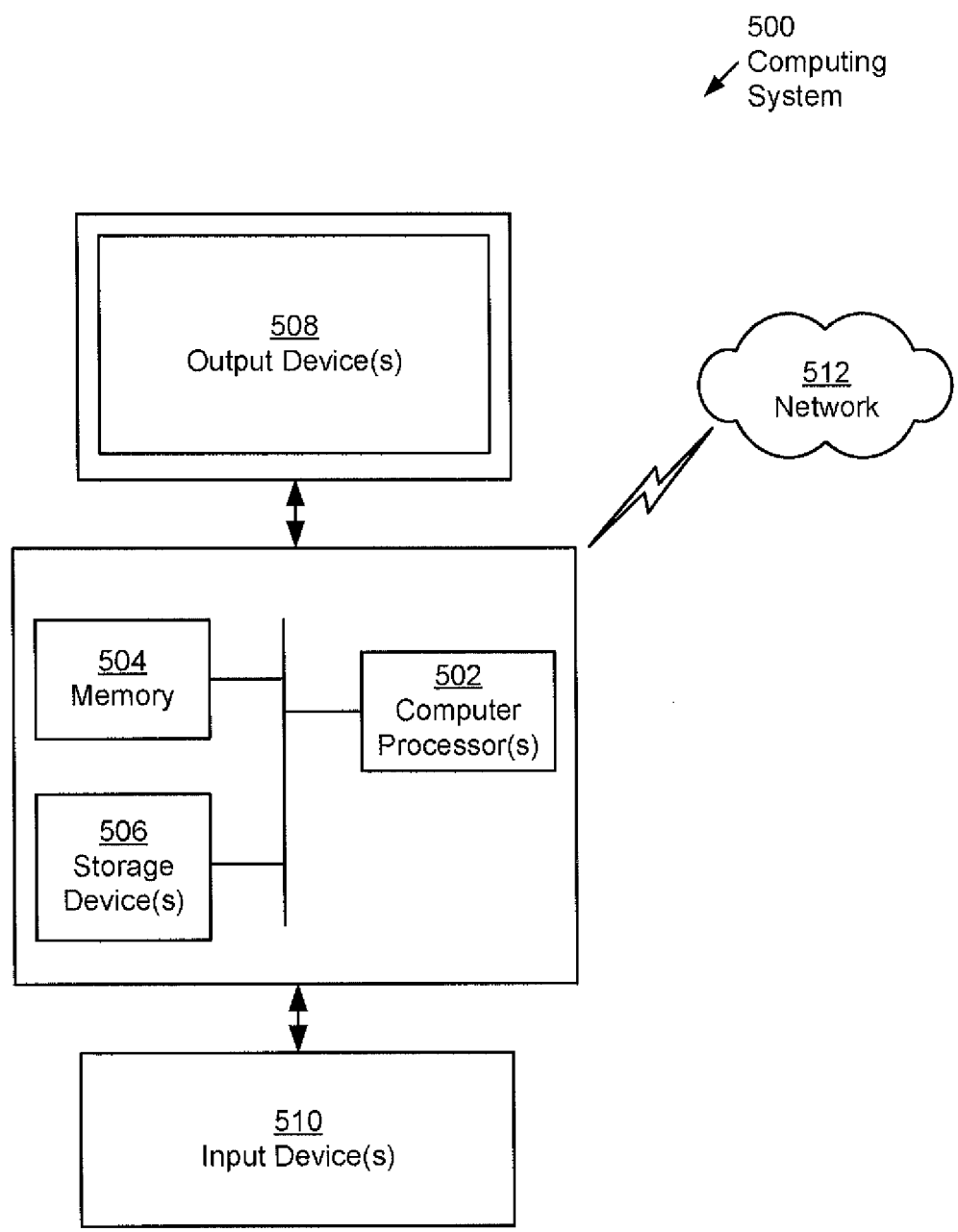
FIG. 5 shows a computer system in accordance with one or more embodiments of the invention.

Embodiments of the invention may be implemented on virtually any type of computing system regardless of the platform being used. For example, the computing system (500) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (800) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a memory safety check of a program, comprising:
    receiving an intermediate representation (IR) of the program, wherein the program is coded in an unmanaged programming language;
    performing a first static analysis pass of the IR to generate a plurality of annotations comprising a safe pointer and an unsafe pointer;
    removing, during a second static analysis pass of the IR, the safe pointer from the plurality of annotations;
    inserting into the IR, before compiling and using the plurality of annotations, a sandbox function call at a preceding step to the unsafe pointer to generate a modified IR;
    compiling the modified IR, including the sandbox function call, to generate an executable version of the program;
    executing, inside a sandbox framework, the executable version of the program;
    generating, during runtime and upon reaching the sandbox function call, a metadata entry and an enhanced pointer;
    comparing, during runtime and upon reaching a use of the unsafe pointer, the metadata entry with the enhanced pointer;
    compressing the unsafe pointer and the metadata entry into a compressed pointer; and
    storing the compressed pointer in memory in place of the unsafe pointer.

2. The method of claim 1, further comprising:
    generating, in response to the metadata entry not validating the enhanced pointer, a memory safety error;
    halting execution of the executable version; and
    displaying the memory safety error.

3. The method of claim 1, wherein compressing the unsafe pointer enables an atomic store of the unsafe pointer and the metadata entry.

4. The method of claim 1, further comprising:
    receiving a request to load the unsafe pointer from memory; and
    decompressing the compressed pointer from memory into the unsafe pointer and the metadata entry.

5. The method of claim 4, wherein decompressing enables the unsafe pointer to be loaded from memory atomically.

6. The method of claim 5, wherein the program is multi-threaded.

7. The method of claim 1, wherein the metadata entry comprises an unsafe object address, an unsafe object size, and an unsafe object signature and the enhanced pointer comprises an index, a signature, and an offset.

8. The method of claim 7, wherein the offset and the unsafe object address enable pointer arithmetic to be performed.

9. The method of claim 1, further comprising:
    identifying, during the first static analysis pass of the IR, a pointer escape instruction that stores a pointer to a memory location;
    annotating the pointer escape instruction with an escape annotation; and
    adding the pointer escape instruction to a plurality of locations.

10. A system for performing a memory safety check of a program, comprising:
    a processor;
    a compiler, executing on the processor, and configured to:
        receive intermediate representation (IR) of the program, wherein the program is coded in an unmanaged programming language;
        perform a first static analysis pass of the IR to generate a plurality of annotations comprising a safe pointer and an unsafe pointer;
        remove, during a second static analysis pass of the IR, the safe pointer from the plurality of annotations;
        insert into the IR, before compilation and using the plurality of annotations, a sandbox function call at a preceding step to the unsafe pointer to generate a modified IR; and
        compile the modified IR, including the sandbox function call, to generate an executable version of the program;
    a sandbox framework executing on the processor and configured to:
        execute the executable version of the program;
        generate, during runtime and upon reaching the sandbox function call, a metadata entry and an enhanced pointer;
        compare, during runtime and upon reaching a use of the unsafe pointer, the metadata entry with the enhanced pointer;
        compress the unsafe pointer and the metadata entry into a compressed pointer; and
        store the compressed pointer in memory in place of the unsafe pointer.

11. The system of claim 10, the sandbox framework further configured to:
  generate, in response to the metadata entry not validating the enhanced pointer, a memory safety error;
  halt execution of the executable version; and
  display the memory safety error.

12. The system of claim 10, wherein compressing the unsafe pointer enables an atomic store of the unsafe pointer and the metadata entry.

13. The system of claim 10, the sandbox framework further configured to:
  receive a request to load the unsafe pointer from memory; and
  decompress the compressed pointer from memory into the unsafe pointer and the metadata entry.

14. The system of claim 13, wherein decompressing enables the unsafe pointer to be loaded from memory atomically.

15. The system of claim 14, wherein the program is multi-threaded.

16. The system of claim 10, wherein the metadata entry comprises an unsafe object address, an unsafe object size, and an unsafe object signature and the enhanced pointer comprises an index, a signature, and an offset.

17. The system of claim 16, wherein the offset and the unsafe object address enable pointer arithmetic to be performed.

18. The system of claim 10, further comprising:
  identifying, during the first static analysis pass of the IR, a pointer escape instruction that stores a pointer to a memory location;
  annotating the pointer escape instruction with an escape annotation; and
  adding the pointer escape instruction to a plurality of locations.

19. A non-transitory computer readable storage medium (CRM) storing instructions for performing a memory safety check of a program, the instructions executable on a processor and comprising functionality to:
  receive an intermediate representation (IR) of the program, wherein the program is coded in an unmanaged programming language;
  perform a first static analysis pass of the IR to generate a plurality of annotations comprising a safe pointer and an unsafe pointer;
  remove, during a second static analysis pass of the IR, the safe pointer from the plurality of annotations;
  insert into the IR, before compilation and using the plurality of annotations, a sandbox function call at a preceding step to the unsafe pointer to generate a modified IR;
  compile the modified IR, including the sandbox function call, to generate an executable version of the program;
  execute, inside a sandbox framework, the executable version of the program;
  generate, during runtime and upon reaching the sandbox function call, a metadata entry and an enhanced pointer;
  compare, during runtime and upon reaching a use of the unsafe pointer, the metadata entry with the enhanced pointer;
  compress the unsafe pointer and the metadata entry into a compressed pointer; and
  store the compressed pointer in memory in place of the unsafe pointer.

20. The system of claim 19, wherein compressing the unsafe pointer enables an atomic store of the unsafe pointer and the metadata entry.

21. The non-transitory CRM of claim 19, the instructions further comprising functionality to:
  receive a request to load the unsafe pointer from memory; and
  decompress the compressed pointer from memory into the unsafe pointer and the metadata entry.

22. The non-transitory CRM of claim 21, wherein decompressing enables the unsafe pointer to be loaded from memory atomically.

23. The non-transitory CRM of claim 22, wherein the program is multi-threaded.

* * * * *

UNITED STATES PATENT AND TRADEMARK OFFICE
CERTIFICATE OF CORRECTION

PATENT NO. : 9,530,006 B2  
APPLICATION NO. : 14/251519  
DATED : December 27, 2016  
INVENTOR(S) : Troeger et al.

Page 1 of 1

It is certified that error appears in the above-identified patent and that said Letters Patent is hereby corrected as shown below:

In the Specification

In Column 13, Line 34, delete ""!1ptr_swizzle" and insert -- !lptr_swizzle --, therefor.

In Column 13, Line 34, delete ""!1ptr_escape" and insert -- !lptr_escape --, therefor.

In Column 13, Line 35, delete ""!1ptr_unswizzle_typed" and insert -- !lptr_unswizzle_typed --, therefor.

In the Claims

In Column 18, Line 26, in Claim 20, delete "system" and insert -- non-transitory CRM --, therefor.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*